(12) United States Patent
Cross

(10) Patent No.: US 12,497,989 B2
(45) Date of Patent: Dec. 16, 2025

(54) RING FASTENER

(71) Applicant: Cross Manufacturing Company (1938) Limited, Bath (GB)

(72) Inventor: Edward Cross, Bath (GB)

(73) Assignee: Cross Manufacturing Company (1938) Limited, Bath (GB)

( * ) Notice: Subject to any disclaimer, the term of this patent is extended or adjusted under 35 U.S.C. 154(b) by 0 days.

(21) Appl. No.: 18/997,513

(22) PCT Filed: Jun. 20, 2023

(86) PCT No.: PCT/GB2023/051603
§ 371 (c)(1),
(2) Date: Jan. 21, 2025

(87) PCT Pub. No.: WO2024/018170
PCT Pub. Date: Jan. 25, 2024

(65) Prior Publication Data
US 2025/0257756 A1    Aug. 14, 2025

(30) Foreign Application Priority Data

Jul. 20, 2022    (GB) ...................................... 2210635

(51) Int. Cl.
*F16B 21/18* (2006.01)
*F16B 2/24* (2006.01)
(52) U.S. Cl.
CPC ............ *F16B 21/186* (2013.01); *F16B 2/243* (2013.01); *F16B 21/183* (2013.01)
(58) Field of Classification Search
CPC ....... F16B 21/186; F16B 2/243; F16B 21/183
See application file for complete search history.

(56) References Cited

U.S. PATENT DOCUMENTS 2,760,262 A * 8/1956 Homan .................. B65D 25/32
215/397
4,305,179 A * 12/1981 Sakurada ................ F16L 33/03
24/23 R
(Continued)

FOREIGN PATENT DOCUMENTS

DE     102008008983 A1    8/2009
DE     102012206676 A1    10/2013
(Continued)

*Primary Examiner* — Ryan J. Walters
(74) *Attorney, Agent, or Firm* — Dickinson Wright PLLC; Andrew D. Dorisio

(57) ABSTRACT

A ring fastener comprising a discontinuous band having first and second axial faces on opposite sides, a first end with a first end face and a groove extending from the first end face and opening to the first axial face; a second end with a second end face and a tongue projecting from the second end face; wherein the groove is u-shaped and the second axial face defines the base of the groove, and the tongue is dimensioned to fit in the groove; such that, when the tongue is received in the groove, the first end is located relative to the second end and a continuous ring is formed. A method of assembling the ring fastener into a circumferential groove in a component comprises the steps of feeding the ring fastener into the groove so that the ends are adjacent to each other; distorting the second end axially out of the plane of the groove; bringing the ends towards each other until the tongue overlies the groove; and inserting the tongue into the groove so that the ends are within groove.

8 Claims, 1 Drawing Sheet

(56) References Cited

U.S. PATENT DOCUMENTS

| | | | | |
|---|---|---|---|---|
| 4,312,101 | A | * | 1/1982 | Oetiker ................ F16L 33/025 |
| | | | | 24/20 R |
| 4,987,650 | A | * | 1/1991 | Eickmann ............. F16B 21/186 |
| | | | | 24/456 |
| 5,191,683 | A | * | 3/1993 | Ojima .................. F16L 33/025 |
| | | | | 24/20 R |
| 6,463,632 | B2 | * | 10/2002 | Craig, Jr. .............. F16L 33/025 |
| | | | | 24/24 |
| 8,516,661 | B2 | * | 8/2013 | Maskell ................... F16B 2/08 |
| | | | | 24/23 R |
| 2010/0278587 | A1 | | 11/2010 | Maskell |
| 2022/0065280 | A1 | | 3/2022 | Zuber |

FOREIGN PATENT DOCUMENTS

| | | |
|---|---|---|
| EP | 2028398 A1 | 2/2009 |
| GB | 515230 A | 11/1939 |
| GB | 744456 A | 2/1956 |
| GB | 2584097 A | 11/2020 |

* cited by examiner

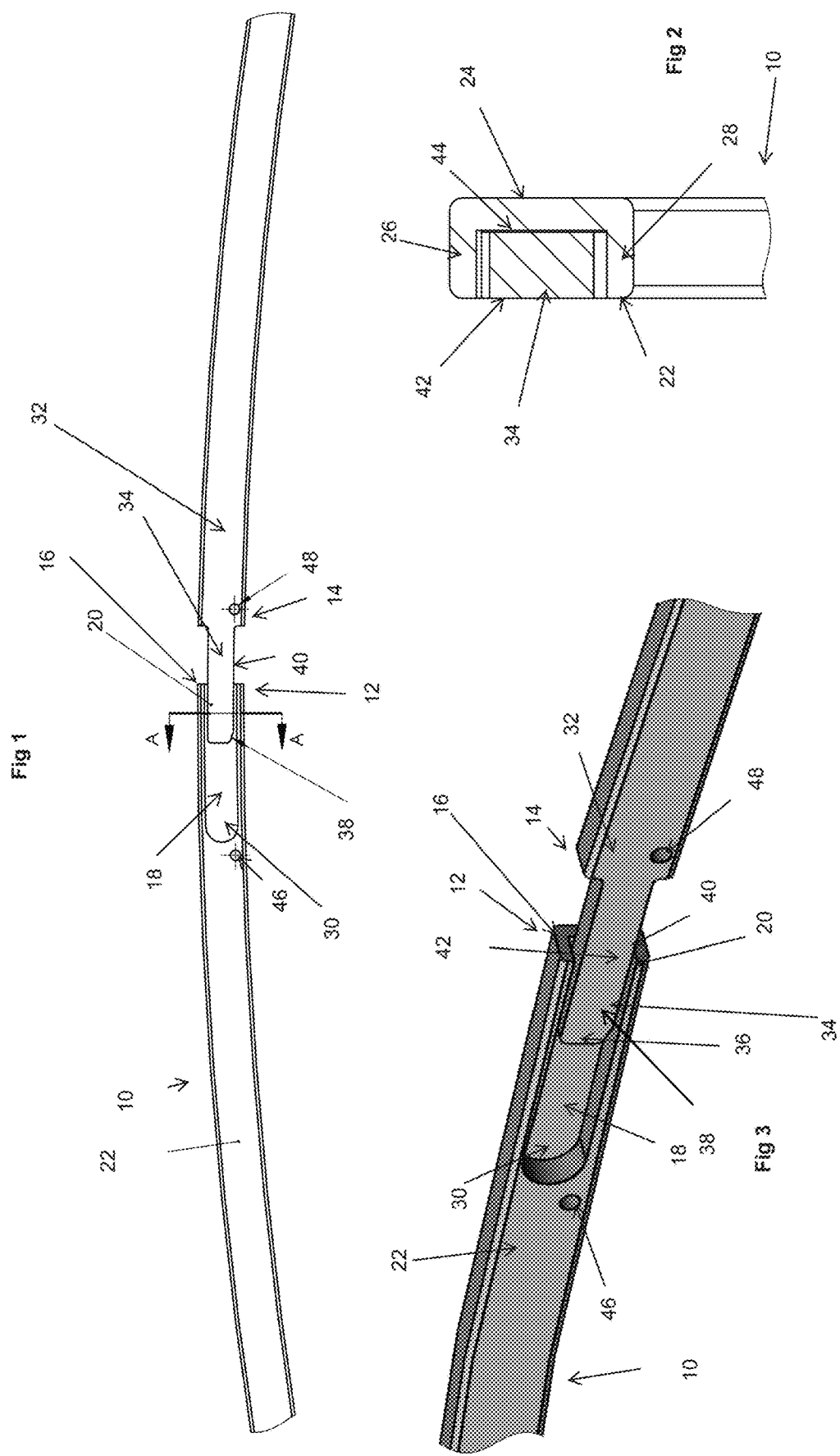

RING FASTENER

FIELD OF INVENTION

This invention relates to a ring fastener, such as a retaining ring, and methods of assembling the ring fastener into a groove of a component.

BACKGROUND TO THE INVENTION

Retaining rings can have many different applications, but are often used to secure components together, such as to secure two rotating parts together. For example, a retaining ring can be fitted into a groove on an internal surface of a bore to act as a shoulder to mount or secure a component in the bore.

One example of a retaining ring is a spiral retaining ring, which comprises a single turn band with a gap in the circumference of the ring. When installed, the ends of the ring are brought together and can be in contact. However, during use, any thermal expansion of the ring can cause the ends of the ring to move apart, thus opening up the gap. This type of retaining ring therefore does not provide reliable full circumference support for the components during use.

Some retaining rings overcome this problem by providing a two or more turn retaining ring. However, the material used to produce such a ring is much thinner than a single turn ring, and as such each ring does not provide sufficient torsional stiffness. This can result in the ring twisting during use, which can reduce the stability of the ring and its ability to effectively secure components together.

WO2020/234572 describes a ring fastener comprising a discontinuous band having a first end and a second end. The first end comprises a pair of spaced-apart elongate finger members (having a first finger member and a second finger member), and the second end comprises an elongate tongue member. The finger members and the tongue member are interlockable, such that when interlocked, the band comprises a continuous circumference. The ring fastener further comprises a closed configuration wherein the finger members and the tongue member are substantially aligned with a circumferential surface of the band; and an open configuration wherein the first finger member is radially and/or axially deflected from its substantially aligned position, so that it is angled with respect to the circumferential surface of the band.

The present invention therefore aims to provide reliable full circumference support during use, whilst also maintaining a stable and effective connection between two components with a relatively simple and robust construction.

SUMMARY OF THE INVENTION

A first aspect of the invention comprises a ring fastener comprising:
 a discontinuous band having first and second axial faces on opposite sides,
 a first end with a first end face and a groove extending from the first end face and opening to the first axial face;
 a second end with a second end face and a tongue projecting from the second end face
 wherein the tongue is dimensioned to fit in the groove;
 such that, when the tongue is received in the groove, the first end is located relative to the second end and a continuous ring is formed.

The tongue and groove arrangement is relatively robust and can be assembled and disassembled by simply distorting the ring to engage or disengage the tongue and groove.

The groove can be u-shaped and the second axial face defines the base of the groove.

The axial thickness of the tongue can be substantially the same as the axial depth of the groove. In this way, the surface of the tongue can be substantially flush with the first axial face of the ring at the first end. This avoids any part projecting in a way that could catch or interfere with other components in use. The tongue can extend from the first axial face of the second end and can be set back from the second axial face of the second end. Thus, the first and second axial faces of the first and second ends can be aligned and flush.

The tongue can have parallel radial sides and a terminal end face. The tongue can comprise an angled edge between one of the radial sides of the tongue and the terminal end. This can aid in insertion of the tongue into the groove.

The length of the groove from the first end face can be greater than the length of the tongue extending from the second end face. This can avoid the end face of the tongue contacting the end of the groove and causing distortion or damage of one and/or the other.

The first and second end faces can be spaced apart when the tongue is received in the groove. This allows some relative movement of the end faces due to thermal expansion or contraction or other forces.

Another aspect of the invention comprises a method of assembling a ring fastener into a circumferential groove in a component, the method comprising the steps of:
 feeding the ring fastener into the circumferential groove so that the first and second ends are adjacent to each other;
 distorting the second end axially out of the plane of the circumferential groove;
 bringing the first and second ends towards each other until the tongue overlies the groove; and
 inserting the tongue into the groove so that the first and second ends are within the circumferential groove of the component.

BRIEF DESCRIPTION OF THE DRAWINGS

FIG. 1 shows a portion of an embodiment of a ring fastener in an interlocked position.

FIG. 2 shows a cross section on the line AA of FIG. 1.

FIG. 3 shows a perspective view of the portion shown in FIG. 1.

DETAILED DESCRIPTION OF EMBODIMENTS

The ring fastener shown in the drawings is essentially circular in shape. Only part of the ring is shown in the drawings.

The ring fastener shown in the drawing is typical of such fasteners used in turbines such as gas turbines for securing components, for example within bores. The fasteners will be made from alloys having suitable high temperature strength and oxidation resistance.

The fastener is formed from a metal strip 10 having a substantially rectangular cross section with rounded corners. The strip has axial faces and radial faces.

The strip does not form a complete circle, but instead is discontinuous, having opposed end faces 12, 14.

A first end 16 of the strip 10 is formed with a groove 18 which extends from an open end 20 at the first end face 12 and opens onto one of the axial surfaces 22. The other axial surface 24 defines the base of the groove 18 which is essentially u-shaped, the radial sides of the strip 26, 28 defining the sides of the groove 18. The closed end 30 of the groove 18 is radiused.

The second end 32 of the strip 10 is formed with a tongue 34 projecting from the second end face 14. The tongue 34 is substantially straight-sided and has a squared-off terminal end face 36. There is an angled edge 38 between one side 40 and the terminal end face 36. The tongue 34 is narrower than the width of the strip 10 and is dimensioned so as to be able to fit in the groove 18.

The tongue 34 is offset to one side of the second end 32 so that one face 42 of the tongue is flush with the axial face 22 of the strip 10. The other face 44 of the tongue is set back from the opposite axial face 24 of the strip 10. The thickness of the tongue 34 is about the same as the depth of the groove 18 so that when the tongue 34 is seated in the groove 18, its face 42 is substantially flush with the axial face 22 of the first end 16.

In use, one end of the strip 10 will be fed into a groove in a component, such as a circumferential groove (not shown), and the strip 10 fed around the component until the two ends 16, 32 are close to each other. At this point, the second end 32 with the tongue 34 can be bent away from the plane of the circle and forced to lie over the first end 16 with the groove 18. The tongue 34 can then be urged into the groove 18, the angled edge 38 allowing the tongue 34 to clear the side of the groove 18. At this point, part of the tongue 34 will sit in the groove 18 so that the ring fastener presents a complete circumference but with the end faces 12, 14 separated by a small distance. The length of the tongue 34 is such that the terminal end face 36 of the tongue 34 will not contact the closed end 30 of the groove 18 even when the tongue 34 is fully inserted into the groove 18 and the end faces 12, 14 abut each other. The space between the end faces 12, 14 allows expansion or contraction due to temperature changes to be accommodated without displacing the ring from the groove.

Holes 46, 48 are provided in the face 22 of the strip near each end 16, 32 to allow the use of assembly tools (not shown) to manipulate the ends 16, 32 of the strip 10 so that the tongue 34 can be inserted into or removed from the groove 18.

The invention has been described above with reference to one specific embodiment. Various changes or modifications can be made without departing from the scope of the invention.

The invention claimed is:

1. A ring fastener comprising:
    a discontinuous band having first and second axial faces on opposite sides,
    a first end with a first end face and a u-shaped groove extending from the first end face and opening to the first axial face, wherein the second axial face defines a base of the groove;
    a second end with a second end face and a tongue projecting from the second end face, wherein the tongue is dimensioned to fit in the groove;
    such that, when the tongue is received in the groove, the first end is located relative to the second end and a continuous ring is formed, and wherein an axial thickness of the tongue is substantially the same as an axial depth of the groove, such that a surface of the tongue is substantially flush with the first axial face of the ring at the first end.

2. The ring fastener as claimed in claim 1, wherein the tongue extends from the first axial face of the second end.

3. The ring fastener as claimed in claim 2, wherein the tongue is set back from the second axial face of the second end.

4. The ring fastener as claimed in claim 1, wherein the tongue has parallel radial sides and a terminal end face.

5. The ring fastener as claimed in claim 4, wherein the tongue comprises an angled edge between one of the radial sides of the tongue and the terminal end face.

6. The ring fastener as claimed in claim 1, wherein a length of the groove from the first end face is greater than a length of the tongue extending from the second end face.

7. The ring fastener as claimed in claim 1, wherein the first and second end faces are spaced apart when the tongue is received in the groove.

8. A method of assembling a ring fastener as claimed in claim 1 into a circumferential groove in a component, the method comprising the steps of:
    feeding the ring fastener into the circumferential groove so that the first and second ends are adjacent to each other;
    distorting the second end axially out of a plane of the circumferential groove;
    bringing the first and second ends towards each other until the tongue overlies the groove; and
    inserting the tongue into the groove so that the first and second ends are within the circumferential groove of the component.

* * * * *